United States Patent [19]

Gupta

[11] Patent Number: 4,794,051
[45] Date of Patent: Dec. 27, 1988

[54] LOW SHRINKAGE PHENOLIC MOLDING COMPOSITIONS

[75] Inventor: Manoj K. Gupta, Williamsville, N.Y.

[73] Assignee: Occidental Chemical Corporation, Niagara Falls, N.Y.

[21] Appl. No.: 48,209

[22] Filed: May 11, 1987

[51] Int. Cl.⁴ .......................... C08K 7/16; C08K 3/34; C08L 61/10
[52] U.S. Cl. .................................... 428/524; 524/445; 524/447; 524/451; 524/594; 524/595
[58] Field of Search ............... 524/445, 447, 594, 595, 524/451; 525/480; 428/524

[56] References Cited

U.S. PATENT DOCUMENTS

| | | | |
|---|---|---|---|
| 4,075,155 | 2/1978 | Philipps | 524/594 |
| 4,116,921 | 9/1978 | Olivo et al. | 528/140 |
| 4,426,467 | 1/1984 | Quist et al. | 524/594 |

Primary Examiner—Lewis T. Jacobs
Attorney, Agent, or Firm—James F. Tao; James F. Mudd; Arthur S. Cookfair

[57] ABSTRACT

Phenolic molding compositions, particularly useful as sheet molding compounds comprise:
(a) a resole phenolic resin,
(b) a curing agent selected from the group consisting of alkaline earth metal oxides or hydroxides and silanes,
(c) a filler,
(d) a lactone such as butyrolactone, and
(e) a fiber reinforcement.

14 Claims, No Drawings

LOW SHRINKAGE PHENOLIC MOLDING COMPOSITIONS

BACKGROUND OF THE INVENTION

This invention relates to improved phenolic molding compositions and, in particular, to sheet molding compositions based on resole phenolic resins and having improved maturation characteristics.

Phenolic molding compositions, based on phenol formaldehyde resins in admixture with fillers, are commonly used to form molded articles which can be readily cured into hard durable molded products. A typical phenolic molding composition is described in U.S. Pat. No. 2,424,787. The patent discloses the use of both "1-stage" or resole and "2-stage" or novolak resin in the production of phenolic molding compositions. In the production of the resole resin molding compositions, the patentee discloses that it is necessary to mix the resin syrup with the filler, because of the liquid nature of the resin. It is further taught that it is preferred to incorporate an alkali metal oxide or an alkaline earth metal oxide including compounds of calcium and magnesium, in the molding composition with the phenolic resin and filler. Magnesium oxide is mentioned as particularly advantageous. The addition of the oxide to the molding composition causes the composition to harden at room temperature or at slightly elevated temperatures. However, this solidification does not convert the resin into the final infusible, insoluble stage and the solidified product may be molded under heat and pressure to form a final molded product.

U.S. Pat. No. 4,075,155 to Philipps, discloses the use of phenol formaldehyde resole molding compositions in sheet molding compound (SMC) technology which heretofore had been generally limited to the use of polyester resins. The molding compositions of Philipps include fillers, compounds such as calcium hydroxide and magnesium hydroxide, mold release agents and coupling agents.

U.S. Pat. No. 3,956,227, discloses phenolic molding compounds including cement which contains calcium oxide and further disclosed the use of silane coupling agents. Sheet molding compounds were disclosed by the patentees. Related patents include U.S. Pat. Nos. 3,944,515 and 3,988,289. A later U.S. Pat. No. 4,182,701, was directed to phenolic molding compounds made by mixing the phenol and aldehyde reactants together with calcium hydroxide and a silane coupling agent. Use of calcium hydroxide and magnesium hydroxide during the reaction of the phenolic resin is also disclosed in U.S. Pat. No. 4,070,331.

Olivo et al in U.S. Pat. No. 4,116,921 disclose phenolic molding compounds made from formaldehyde and bisphenol. The patentees disclose the use of calcium oxide or hydroxide in the molding compounds. These patentees also disclose the use of hollow carbon and hollow phenolic resin microballoons.

British Patent No. 1,363,227 to Farkas discloses sheet molding compounds made from a phenol aldehyde resole resin that is modified with a glycol. The resins are cured with acids. Resins that are modified with oligomers are disclosed in U.S. Pat. No. 4,419,400.

There are several patent applications published in Japan, dealing with this technology. In an application published as No. Sho-56-92727, sheet molding compounds are disclosed which contain resole phenolic resins, calcium and/or magnesium hydroxides or oxides and fillers such as talc, clay and the like.

Japanese Patent Publication No. Sho-58-91935, discloses phenolic molding compounds which contain resole phenolic resins, a thickener, such as the oxides or hydroxides of calcium and magnesium, fillers and reinforcing materials combined with abrasive materials for use in brake shoes. Sheet molding compound technology is used in forming the brake shoes.

Japanese Publication No. Sho-59-170126 discloses sheet molding compounds made with resole phenolic resins, alkaline earth metal oxides or hydroxides impregnated into special configurations of continuous and discontinuous glass fibers.

Commercial sheet molding compositions, whether based on a polyester, phenol-formaldehyde, or other resin, are typically formulated and mixed at a relatively low viscosity, for ease of mixing. It is particularly desirable to achieve as low a viscosity a possible during mixing to allow the addition of larger quantities of fillers, which are relatively inexpensive. It is also important that the viscosity build-up after mixing be relatively fast in order to minimize maturation time. Various inert diluents may be added to lower initial viscosity. However, the presence of such diluents will typically have an adverse effect on the maturation as well as the final physical properties of the molding composition. After mixing, the composition may be combined with fiber reinforcement materials and formed as a sheet in a sandwich configuration between two polymeric films. The polymer films must be removed before the sheet molding composition can be molded to its final form. Generally, phenolic sheet molding compositions are oven-aged at 30° to 60° C. for a few days before the films can be removed by peeling from the phenolic composition. Accordingly, it is an object of the present invention to provide a phenolic molding composition characterized by a relatively low initial viscosity and having improved aging or maturation properties, and requiring a shorter maturation time.

SUMMARY OF THE INVENTION

In accordance with the present invention, phenolic molding compositions, particularly useful as sheet molding compounds comprise:
(a) a resole phenolic resin,
(b) a curing agent selected from the group consisting of alkaline earth metal oxides or hydroxides and silanes,
(c) a filler, and
(d) a lactone such as butyrolactone.

In addition, the composition will also typically contain such adjuvants as a mold release agent, a coupling agent, and the like. The molding compositions of the invention are preferably combined with reinforcing fibers, such as glass fibers or filaments for use in sheet molding processes, pultrusion, filament winding processes, and the like.

The resole phenolic resins, useful in the practice of the invention are generally prepared by reacting a phenol with an excess molar proportion of an aldehyde in the presence of an alkaline catalyst. Examples of phenols which can be used in preparing a phenol aldehyde resole for use in practicing the invention include ortho-para-directing hydroxy or amino aromatic compounds having 6 to 24 carbon atoms such as phenol itself ($C_6H_5OH$), naphthol, anthranol and substituted derivatives thereof where the substituents on the aromatic compound are independently selected from hydrogen;

halogen such as Cl, Br and F; NH$_2$ and hydrocarbon radicals such as:

a. alkyl groups or radicals of 1 to 12 carbon atoms, preferably of 1 to 9 carbon atoms, and their various isomeric forms and substituted on the aromatic nucleus in the ortho or para position;
b. cycloalkyl groups of 5 to 12 carbon atoms such as cyclohexyl, cyclopentyl, methylcyclohexyl, butylcyclohexyl, and so forth;
c. aryl ketonic groups wherein the hydrocarbon portion is as defined below in e.;
d. alkyl, aryl and cycloalkyl carboxylic groups wherein the hydrocarbon part is defined as above in a. and b.;
e. aryl groups of 6 to 24 carbon atoms such as phenyl, naphthyl, anthryl, and the like;
f. aryl substituted alkyl wherein the aryl is phenyl which may contain lower alkyl and/or hydroxy substituents so that the resulting hydroxy aromatic is, for example, a bisphenol;
g. the oxyhydrocarbon radicals corresponding to the foregoing hydrocarbon radicals; and
h. mixtures of the aforesaid hydroxy aromatics.

Suitable substituted phenols include meta-cresol, m-propyl phenol, m-isobutyl phenol, m-sec-butyl phenol, m-tert-butyl phenol, m-bromo phenol, m-chloro phenol, m-phenyl phenol, m-benzyl phenol, m-cetyl phenol, m-cumyl phenol, m-hydroxyacetophenone, m-hydroxybenzophenone, m-d-limonene phenol. The corresponding phenols substituted in the ortho- and para-positions can be used in part but are not preferred.

Mixtures of various hydroxy aromatic compounds mentioned herein also may be used.

Included among the phenolic reactants which may be used are those known as the "cresylic acids" and these often comprise heterogeneous mixtures having two reacting hydrogen positions on each of them; that is, compounds unsubstituted in the ortho- and para-positions, and hence, yield relatively unreactive resins. These compounds may include the following: 3,5-xylenol, m-cresol, 3-4-xylenol, 2,5-xylenol, 2,3-xylenol, phenol, p-cresol, o-cresol, 2,4-xylenol, and 2,6-xylenol. Cresylic acids or tar acids may include phenol and its homologs which may include cresols, xylenols, trimethyl phenols, ethyl phenols, and higher boiling materials such as dihydroxy phenols, polycyclic phenols and the like. They are often obtained by a low-temperature timerization of coal, lignite, and the like, or a conventional high-temperature coke oven tar, or the liquid product of petroleum cracking both thermo and catalytic, shell oil, coal hydrogenation products, and the like.

Polyhydroxyaromatic reactants, such as resorcinol, may also be used.

Also useful in this invention are mixtures of aniline and phenol to react with an aldehyde or ketone to produce a resole.

Also useful in the invention are mixtures of urea and phenol to react with the aldehyde or ketone to produce a resole.

Among the aldehydes which may be used within the scope of this invention to produce resoles are formaldehydes or any of its variations, such as 37 percent or higher concentrations of formalin, or paraldehyde, acetaldehyde, propionaldehyde, isobutyraldehyde, isopentaldehyde, and the like. The aldehyde should have not more than 8 carbon atoms and should not detrimentally affect the resinification of the resin. Preferred aldehydes are those having from 1 to 4 carbon atoms, such as formaldehyde, which may be in aqueous solution (37 percent or higher), or in any of its low polymeric forms such as paraformaldehyde or trioxane. Other aldehydes include para-aldehydes, furfural, 2-ethylhexanal, ethylbutyraldehyde, heptaldehyde, benzaldehyde and crotonaldehyde.

The alkaline catalyst used in preparing the resoles to be used in this invention may be any of those known in the art; for instance, sodium hydroxide and calcium hydroxide. In general, the alkali metal hydroxides and the alkaline earth metal hydroxides and ammonium hydroxide and the amines such as triethanol amines may be used.

In the preparation of the resole, the ratio of aldehyde to phenol employed is preferably in the range of about 1.1:1 to 2.5:1. Generally, the reaction mixture is gradually heated to reflux and held at elevated temperatures of about 60° C. up to the reflux temperature until less than about two percent of free formaldehyde remains. The reaction mixture is then cooled and the catalyst can but need not be neutralized with an acid such as glacial acetic or sulfuric acid. The pH is adjusted to roughly 5 to 8. The resin is then dehydrated to about 60 to 80 percent solids. In the molding compositions of this invention the resole phenolic resin is typically present in amounts of about 20 to about 60 percent by weight.

The curing agents that may be employed in the compositions of this invention include alkaline earth metal compounds, especially the oxides and hydroxides of magnesium, calcium, barium and silane compounds, especially the aminoalkyl silanes. Commercially available silanes that may be employed include gamma-aminopropyltriethoxy silane and N-beta (aminoethyl) gamma-aminopropyltrimethoxy silane. The preferred alkaline earth metal compound curing agents are the oxides and hydroxides of magnesium and calcium and most especially, mixtures thereof.

In the preparation of the sheet molding compound, the resinous composition is laid down on a moving sheet of plastic film. Control of the viscosity of the resinous composition at this point is very important to successful sheet molding compound operation. It has been found that the use of calcium oxide or hydroxide causes rapid hardening of the sheet molding compound. The use of magnesium hydroxide or oxide alone results in a slow hardening rate. A mixture of calcium and magnesium oxides or hydroxides provides excellent control of viscosity of the plastic mass, also referred to as a treating mix, on the moving sheet. The preferred mixtures of calcium and magnesium oxides or hydroxides for this purpose are those wherein the weight ratio of calcium hydroxides or oxide to magnesium hydroxide or oxide is between about 10:1 and 0.1:10. The curing agent is typically employed in an amount of 0.1 to about 15% by weight based on the total weight of the sheet molding composition.

Fillers are employed in the molding compounds of the invention, typically in amounts of about 5 to about 75% by weight of the molding compound. A wide variety of fillers, known in the art, may be employed. The preferred fillers are clay and talc and mixtures thereof. Aluminum trihydrate and various microspheres such as glass, ceramic and organic spheres may also be employed. Auxiliary inorganic or organic fillers are those fillers normally used in phenolic molding compound, and include for example silicates, aluminates, carbides, carbon, carbonates, metals, rock, mineral, sulfates, oxides, mica, wollastonite and the like. Fillers also effect the viscosity of the resinous composition. When talc alone is used as the filler, the viscosity of the plastic mass increases rapidly. When clay alone is used as the filler, the viscosity of the mix increases slowly. However, excellent viscosity control may be achieved when a mixture of talc and clay is used.

Lactones, such as butyrolactone, employed in the compositions of the present invention, as reactive diluents, provide a reduced initial viscosity, that is, during the mixing stage, and an increased viscosity during the maturation stage. The incorporation of a lactone in the molding composition allows a higher loading of fillers which are relatively inert and inexpensive. In addition, it has been found that the presence of a lactone in the molding compositions of this invention results in higher impact strength and lower shrinkage. The lactones that may be employed in the compositions of this invention are characterized by the formula:

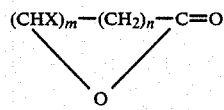

wherein x is halogen, m is 0 or 1, n is 2 to 4, and m+n=2 to 5. Typical lactones that may be employed, include δ-valerolactone, butyrolactone, bromobutyrolactone and the like. The preferred lactone, based on cost, commercial availability, boiling point range and other considerations is butyrolactone.

The amount of lactone incorporated in the present molding compositions may vary considerably depending on the viscosity desired. Typically, the lactone is added in an amount of between about 0.1 and about 10, and preferably about 2.5 to about 5 percent, based on the weight of the molding composition, for sheet molding compositions as well as for pultrusion or filament winding applications.

The mold release agents normally used with phenolic molding compounds are generally employed in the compositions of the invention. Among these are stearic acid and metal salts thereof such as zinc, calcium and magnesium stearates. Organic compounds such as glycerol monostearate can be used.

The molding compounds of this invention may also include a silane coupling agent in an amount of about 0.01 to about 10 percent by weight of the total molding composition to improve the strength properties and the effectiveness of fiber reinforcement. Suitable coupling agents for this purpose are well-known in the art and include, for example, tetraethyloxysilane and various aminoalkylsilanes such as gamma-aminopropyltriethoxysilane, and gamma-aminopropyltrimethoxysilane.

The phenolic resin compositions of the invention may be used to produce bulk or sheet molding compounds by blending the resins with inert fibers and/or fillers. Suitable inert fibers, which may be used to reinforce the final product are glass fibers of varying lengths typically in the range of 1.5 to 50 millimeters. The resins of the invention are particularly suited to use with long glass fibers which are particularly capable of giving high strength products. Long glass fibers generally have a length in the range of about 12 to 50 millimeters. Other inorganic and organic fibers include carbon, graphite, ceramics, polyester, aramid and polyacrylonitrile. The reinforcing inert fibers are preferably employed in an amount of between about 5 and about 60 percent by weight based on the weight of the molding composition.

The sheet molding compounds of the invention may be prepared employing the resins, fillers, inorganic or organic fibers and other additives such as just described in the following manner. The resins are mixed with inorganic fillers containing a divalent base to form a treating mix. The treating mix is flowed onto a first sheet which is preferably a thin plastic sheet or film such as polyethylene, polyester, polypropylene, and the like. A layer of chopped fibers is added to the layer on the first sheet. The treating mix has a controlled viscosity such that it flows onto the sheet to form a layer of uniform thickness, and to properly wet the fibers. The treating mix for sheet molding compounds generally has a viscosity in the range of about 8000 to about 100,000 centipoises at 33° C. A second layer of treating mix is placed on top of the layer of fibers and a second plastic sheet is applied to the upper surface. The resulting composite is passed between a series of rollers to form a mechanically handleable sheet molding compound. The resulting compound is rolled up and stored in a warm room at about 20° to 70° C. for 24 to 100 hours or longer and to form a strippable, moldable sheet molding compound. The resulting product is readily moldable at elevated temperatures to produce a variety of products such as structural panels for use in the transportation industry and in the construction industry.

The molding compositions, or treating mixes of this invention are particularly useful in the preparation of sheet molding compound having improved maturation times. It will be appreciated however, that these molding compositions are also useful in bulk molding processes, filament winding, continuous laminating processes, ram injection molding processes, transfer molding processes and the like. Such processes are well-known in the art and are described, for example, in co-pending application, Ser. No. 784,404.

The following examples are provided to further illustrate this invention and the manner in which it may be carried out. It will be understood, however, that the specific details given in the examples have been chosen for purposes of illustration only and are not to be construed as limiting the invention. In the examples, unless otherwise indicated, all parts and percentages are by weight and all temperatures are in degrees Celsius.

EXAMPLES 1 to 3

A series of molding compositions was prepared as follows: A mixture of clay (Paragon Clay, J. M. Huber Co.); talc; hollow glass microspheres (Q-Cel 600, The PQ Corporation); zinc stearate; calcium hydroxide; and magnesium hydroxide; in the quantities shown in Table 1 were roll-milled for about one-half hour to form a filler mixture.

A resin mixture was then prepared by combining: resole (Durez 51010, Occidental Chemical Corporation); silane coupling agent (Union Carbide A-1102, gamma-aminopropyl triethoxy silane, Union Carbide Corporation); and butyrolactone; and mixing on a high speed mixer. Mixing was continued while the filler mixture was added to the resin mixture over a period of about 3 to 5 minutes. Immediately following the mixing, the temperature of the resulting treating mix was measured and found to be about 60° C., and the viscosity was measured, with the results as set forth in Table 1. The mix was then cooled to room temperature (about 22° C.) and a sample of the mix was then taken and monitored for viscosity increase over a period of several days.

The treating mix was then further mixed with 30 percent glass fibers in a Baker-Perkins mixer to form a bulk molding compound. The bulk molding compound was maturated at room temperature for several days and then compression molded as 8-inch square slabs at 325° F. and 500 psi with a curing cycle of 4 minutes. The shrinkage of the slabs was measured in reference to the cold dimensions of the mold. The slabs were cut and machined and tested for impact strength and flexural strength in accordance with ASTM standard methods with the results as set forth in Table 1.

EXAMPLE 4

The procedure of Examples 1-3 was repeated except that butyrolactone wa omitted. The test results are set forth in the following Table 1.

TABLE 1

| Example Numbers | 1 | 2 | 3 | 4 |
| --- | --- | --- | --- | --- |
| Durez 51010 Phenolic Resin | 510 | 510 | 510 | 600 |
| Butyrolactone | 90 | 90 | 90 | — |
| Clay | 125 | 162 | 200 | 125 |
| Glass Spheres Q-Cel 600 | 125 | 125 | 125 | 125 |
| Talc | 125 | 125 | 125 | 125 |
| Silane Coupling Agent | 36 | 36 | 36 | 36 |
| Ca(OH)$_2$ | 23.7 | 23.7 | 23.7 | 23.7 |
| Mg(OH)$_2$ | 23.7 | 23.7 | 23.7 | 23.7 |
| Zinc Stearate | 17.5 | 17.5 | 17.5 | 17.5 |
| Fiberglass (¼") Certainteed B-235 | 375 | 375 | 375 | 375 |
| Viscosity at 60° C. | 12,800 | 13,400 | 25,600 | 59,200 |
| Viscosity at Room Temperature | 448,000 | 528,000 | 688,000 | 1,216,000 |
| Viscosity after 3 days at Room Temperature | 7,520,000 | 16,000,000 | | 3,200,000 |
| Shrinkage (inch/inch) | 0.009 | 0.0011 | 0.0009 | 0.0021 |
| Notched Izod Impact Strength (ft-lb/inch) | 1.94 | 1.71 | 1.92 | 1.43 |
| Flexural Strength (psi) | 12,660 | 11,740 | 12,120 | 14,660 |

What is claimed is:

1. A molding composition comprising:
   (a) a resole phenolic resin,
   (b) a curing agent selected from the group consisting of alkaline earth metal oxides, alkaline earth metal hydroxides and silanes,
   (c) a filler in an amount of about 5 to about 75 percent by weight of said molding composition, and
   (d) a lactone of the formula

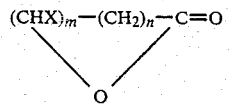

wherein x is halogen, m is 0 or 1, n is 2 to 4 and m+n is 2 to 5.

2. A molding composition according to claim 1 wherein the lactone is butyrolactone.

3. A molding composition according to claim 2 wherein butyrolactone is present in an amount of about 1 to about 10 percent by weight based on the weight of resole phenolic resin.

4. A molding composition according to claim 2 wherein the curing agent is selected from the group consisting of alkaline earth metal oxides, alkaline earth metal hydroxides, and mixtures thereof.

5. A molding composition according to claim 4 wherein the curing agent is present in an amount of about 0.1 to about 15 percent by weight based on the total weight of the molding composition.

6. A molding composition acording to claim 5 wherein the curing agent is a mixture of calcium compound selected from the group consisting of calcium oxide and calcium hydroxide and a magnesium compound selected from the group consisting of magnesium oxide and magnesium hydroxide.

7. A modling composition according to claim 6 wherein the weight ratio of calcium oxide or hydroxide to magnesium oxide or hydroxide is between about 10:1 and about 1:10.

8. A molding composition comprising the molding composition of claim 2 in combination with fiber reinforcement.

9. A molding composition acording to claim 8 wherein the fiber reinforcement is about 5 to about 60 percent by weight glass fiber, based on the weight of the molding composition.

10. A molding composition according to claim 2 wherein the filler is selected from the group consisting of clay, talc, microspheres, aluminum trihydrate, a mixture of clay and talc, and a mixture of clay, talc and microspheres.

11. A molding composition according to claim 10 wherein the filler is present in an amount of about 5 to about 60 percent by weight based on the weight of the molding composition.

12. A sheet molding compound comprising a fiber reinforced treating mix sandwiched between polymeric films, said treating mix comprising in percent by weight, based on the total composition, about 20 to about 60 percent resole phenolic resin; about 0.1 to about 15 percent of a curing agent selected from the group consisting of alkaline earth metal oxides, alkaline earth metal hydroxides, and silanes, about 5 to about 60 percent filler; and about 2.5 to about 15 percent of a lactone of the formula

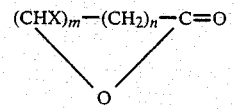

wherein x is halogen, m is 0 or 1, n is 2 to 4, and m+n is 2 to 5.

13. A sheet molding compound according to claim 12 wherein the lactone is butyrolactone.

14. A sheet molding compound according to claim 13 wherein the filler is selected from the group consisting of clay, talc, a mixture of clay and talc, microspheres, aluminum trihydrate, and a mixture of clay, talc and microspheres.

* * * * *